United States Patent [19]

van Mil

[11] 4,266,322
[45] May 12, 1981

[54] DEVICE FOR MAKING A CUT EXTENDING FROM THE VENT TOWARD THE BREAST IN A SLAUGHTERED BIRD

[75] Inventor: Martinus P. G. van Mil, Boxmeer, Netherlands

[73] Assignee: Stork PMT B.V., Boxmeer, Netherlands

[21] Appl. No.: 10,233

[22] Filed: Feb. 8, 1979

[30] Foreign Application Priority Data

Feb. 15, 1978 [NL] Netherlands ................ 7801712

[51] Int. Cl.³ ............................................. A22C 21/00
[52] U.S. Cl. .......................................................... 17/11
[58] Field of Search ................................. 17/11, 45

[56] References Cited

U.S. PATENT DOCUMENTS

| | | | |
|---|---|---|---|
| 2,795,815 | 6/1957 | Dahlberg | 17/11 |
| 3,886,635 | 6/1975 | Meyn | 17/11 |
| 4,117,570 | 10/1978 | Meyn | 17/11 |
| 4,136,421 | 1/1979 | Scheier | 17/11 X |

Primary Examiner—Willie G. Abercrombie
Attorney, Agent, or Firm—Silverman, Cass & Singer, Ltd.

[57] ABSTRACT

Device for making a cut in a slaughtered bird, starting from the vent and directed toward the breast, comprising a first knife for making a round cut around the vent of a bird and a second knife movable sideways and away from the first knife to avoid the intestines of the bird while making a cut from the vent to the breast bone of the bird the knife being rotatably disposed in a holder, which is pivotally connected to a connecting rod and coupled to driving means adapted to carrying out a backward and forward swinging movement.

26 Claims, 6 Drawing Figures

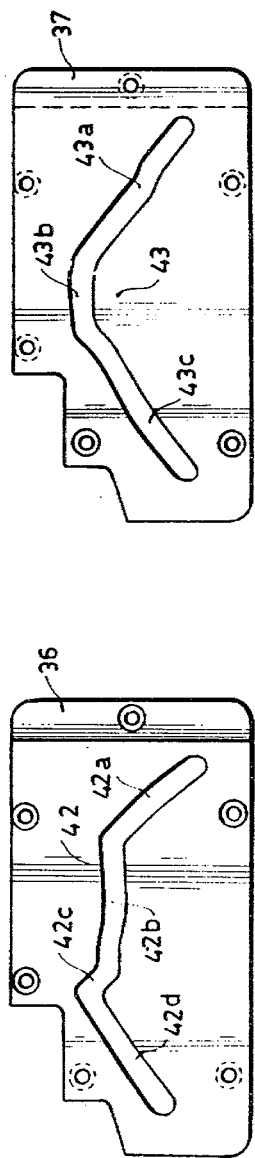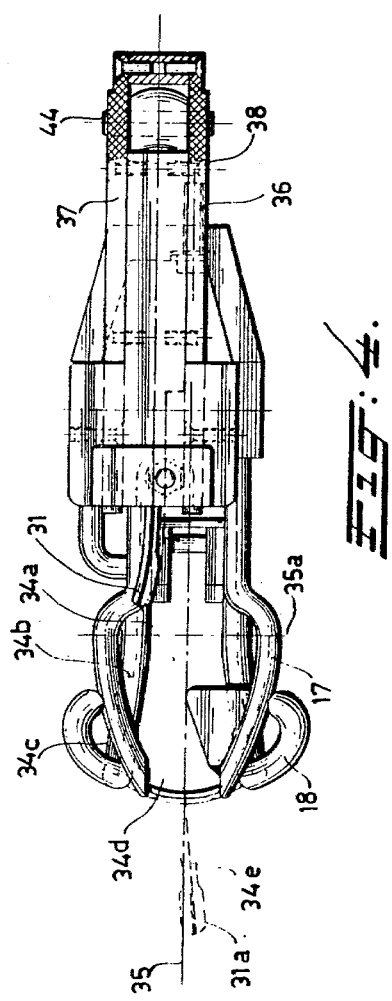

DEVICE FOR MAKING A CUT EXTENDING FROM THE VENT TOWARD THE BREAST IN A SLAUGHTERED BIRD

BACKGROUND OF THE INVENTION

The invention relates to an apparatus for making a cut extending from the vent toward the breast in slaughtered birds, a first, round cut being made around the vent followed by a second cut starting therefrom and directed toward the breast of the bird.

The invention furthermore relates to a device for making a cut in slaughtered birds extending from the vent toward the breast, the device comprising a knife mounted in a frame and traveling with its cutting edge, along the path of a circle while being capable of being driven rotatably, and in the vicinity thereof disposed in a holder, a second knife capable of moving in a direction away from the first knife, the path of the holder being determined by the movement of at least one cam connected thereto traveling in a non-linear guideway.

DISCUSSION OF THE PRIOR ART

A device as described above is known per se. According to said known device, the cutting knife, starting from the annular opening made around the vent, travels in a straight path to the chest bone. Hereby the danger exists that the knife point will touch parts of the entrails section, in particular intestines, thus contaminating the bird's meat with the contents thereof, so that the bird must be rejected. Dutch patent application No. 75,13767, laid open to public inspection, already proposes a device whose object it is to obviate this drawback, but it is relatively complicated: in this device a hollow ball connected to the cutting knife is used which can be divided into two halves which can be moved independently of one another by means of a suitable driving mechanism; after bringing the ball inside the bird, the ball divides into two parts whereupon one ball half pushes the entrails to the side while the knife makes the cut.

SUMMARY OF THE INVENTION

The present invention is based upon the insight that the effect aimed at, i.e. preventing damage to the entrails, is obtainable in a simple manner, merely by making a proper choice of the path of the knife. Consequently, the method of the invention is carried out in such a manner that, while making the second cut, the cutting edge during its movement away from the vent is caused to make a sideward movement over at least a part of its travel such, that the cutting edge moves aside the area comprising the entrails.

This measure, which hardly makes a device for making this cut more complicated, effectively ensures that when making the cut the cutting edge of the knife cannot come into contact with the entrails.

In a device for carrying out the method as described hereinbefore the knife-holding arm is rotatably disposed in a holder and is provided, at its end opposite the knife, with the guide cam, the latter holder being pivotally connected about an axis crossing the axis of the knife-holding arm, being connected to a connecting rod pivoting in the frame and coupled to driving means adapted to carry out a backward-and-forward swinging movement.

The track of the guideway is then such that during the movement directed toward the breast point the cutting knife, starting from the round cut made by the rotating knife, initially carries out a movement directed sideways away from the connecting line between the vent and the breast point, followed by a movement directed toward said connecting line.

A very simple embodiment is obtained when the oblong knife-holding arm is hook-shaped having a short first part receiving the cutting knife and a second part located in the holder, the end protruding from the holder being provided with the guide cam, and the hinge joint of the holder and connecting rod being located between the flanged end and said guide cam.

The second part of the knife-holding arm located in the holder is cylindrical and supported in one or more bearing bushings located in the holder.

A favorable embodiment is obtained when the frame is provided with at least one guide plate which is located perpendicularly to the axes of the hinge joints of the connecting rod and parallel to the path of the holder comprising the guideway receiving the cam.

This measure has the advantage that the path of the knife is fully determined by the pattern of the guide slot in both a vertical and a horizontal direction, and that the device can be easily adapted to different dimensions and kinds of birds by using a plate with a different profile.

Preferably, the knife-holding arm is provided with two aligned cams protruding on both sides, each one co-operating with a corresponding guideway formed in each of the two parallel guide-plates.

A favorable embodiment enabling a high production rate comprises a frame provided with positioning elements for the birds being arranged together with a number of corresponding frames in a circle and rotatable about a central shaft in a common framework to be placed at a cutting locus along a conveyor for slaughtered birds by which the birds are transported hanging by their legs, to be driven in synchronism with the conveyor.

SURVEY OF THE DRAWINGS

FIG. 4 is a top view of this device;

FIG. 5a is a lateral view of the first guide plate;

FIG. 5b is a lateral view of the second guide plate.

DESCRIPTION OF A PREFERRED EMBODIMENT

Figure 1:
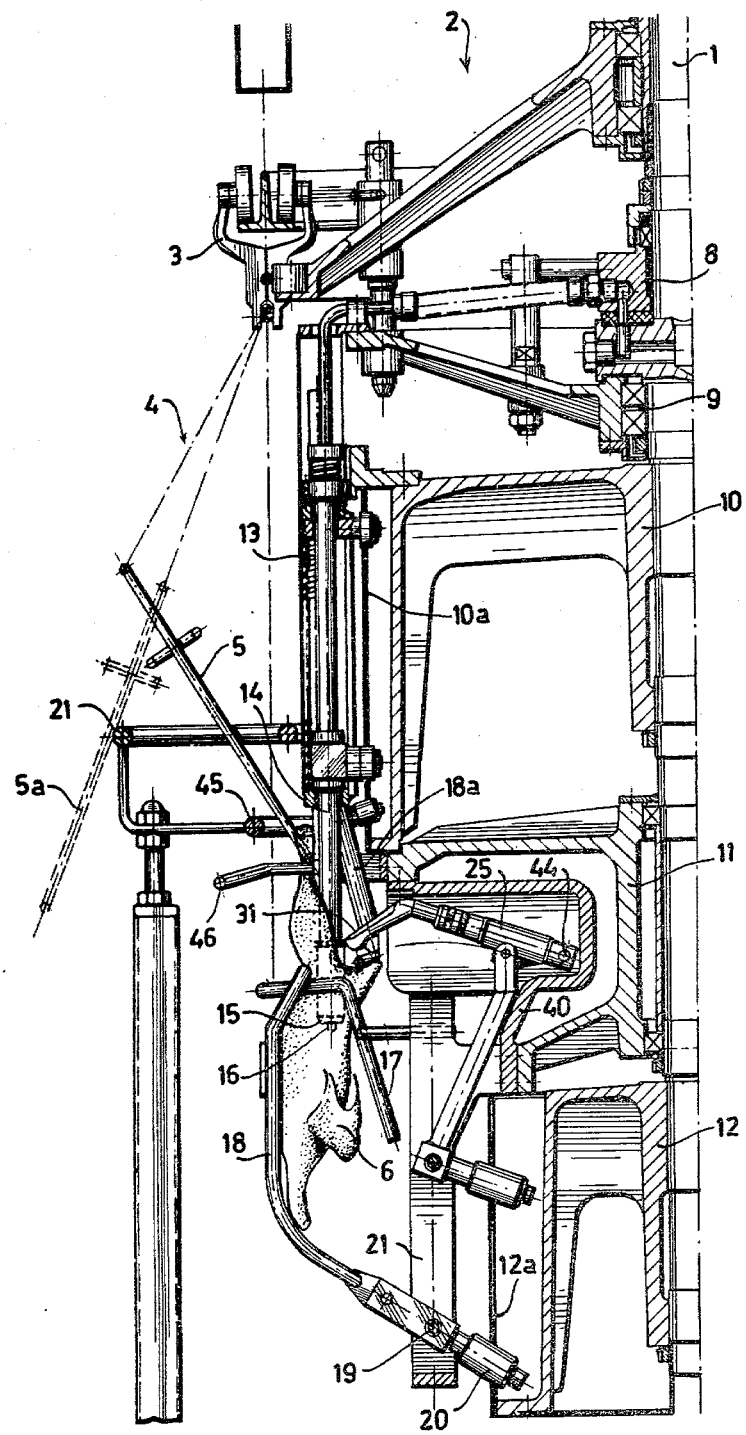
FIG. 1 is a longitudinal cross-sectional view of a treatment unit of the device according to the invention.
Figure 2:
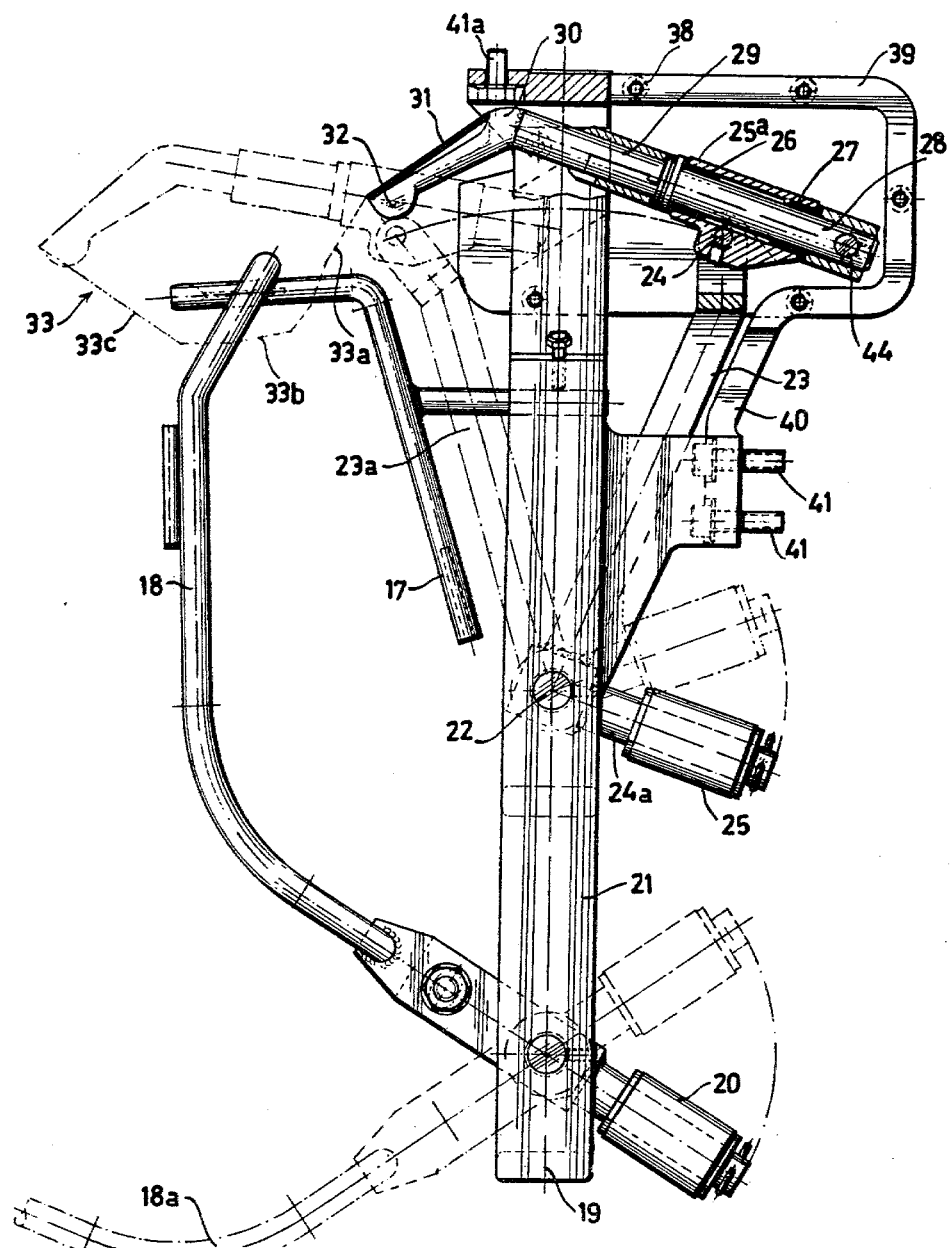
FIG. 2 is an enlarged view of the most important parts of this device, in particular the knife-holding arm.
Figure 3:
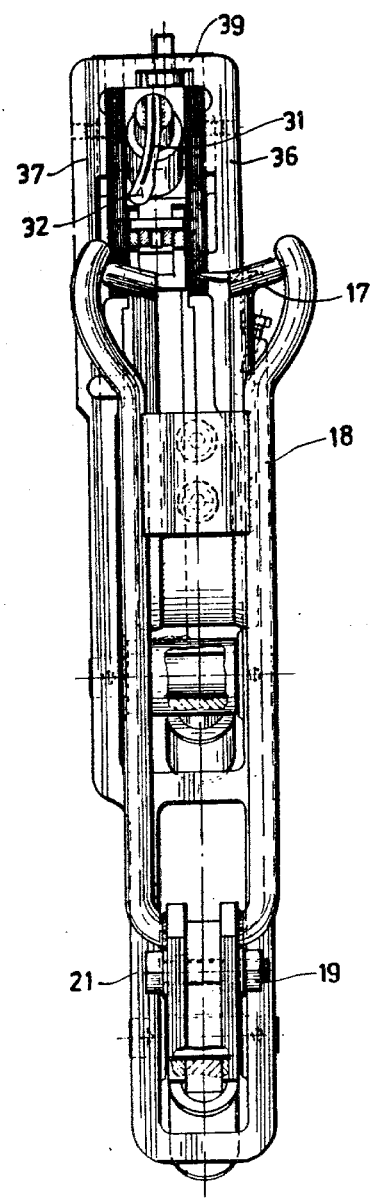
FIG. 3 is a front view of the device according to the invention.

FIG. 1 shows a central shaft 1, about which a number of treatment units are rotatably arranged, one of which being indicated in its entirety by the reference numeral 2. The treatment units rotate about said shaft in synchronism with a moving conveyor 3 known per se, to which, by way of the suspension rods 4 schematically indicated, there are suspended the known hooks 5, by which the birds 6, hooked into the hook openings by their legs, are transported. As is known in the art, the various treatment functions and movements are controlled by the movement of detents and cams of each unit along stationary guideways, not shown in detail. The complete device comprises a number, depending upon the capacity desired, of for example, sixteen to twenty units arranged at regular distances around the central shaft 1 and of the type as illustrated; the movements of the conveyor and that of the treatment units are adjusted to each other and synchronized in a manner such, that the birds are introduced into a treatment unit, are clamped therein, remain in the treatment unit during the treatment (making the cut), while simultaneously traveling in a circular, curved path, and subsequently leaving the unit. FIG. 1 shows a number of frames 7 to 12 inclusive, of which the frames 10 and 12, provided with guideways, are stationary and the frames 7 to 9 inclusive and 11 rotate jointly around the shaft 1. The frames 9 and 11 support an operating unit 13, the rod 14 of which is driven both rotatably and vertically by driving means, not shown, while holding at its lower extremity the round cutting knife 15 with the guide pin 16. This known combination of cutting knife 15 and guide pin 16 serves to make a round cut around the vent from where the cut directed toward the breast point is to be made. During this treatment the bird is secured in position between the fixed detent 17 and the movable detent 18 which can turn around the pin 19 and whose driving cam 20 co-operates with the curved track 12a. During treatment the hook 5 is in the pulled-up position, as drawn. In the position 5a of the hook, the hook with the bird hanging thereon will not pass through the device but instead will go around it on the outside, because the side of the hook will run against the guideway 21. The bird is drawn in the Figure in the treatment position. The tail is then pressed backwards by the detent 18a. In FIG. 2, which is an enlarged view of the elements of importance to the invention, the discontinuous lines 18a indicate the position of the movable detent 18 for introducing the bird into the treatment unit; continuous lines indicate in this Figure the position during the treatment.

The elements of importance to the invention are formed by the cutting knife for making the cut running from the round cut made in the vent toward the breast point, and the special actuating elements therefor.

FIG. 2 shows the vertical support 21, which is connected to a frame 11 and which supports the pivotal detent 18, and wherein, at a distance upwards from the point of rotation 19, the pivot 22 supports the connecting rod 23 with the operating arm 24a fixedly connected thereto having an operating cam 25 which cooperates with a guideway not shown in the drawing. The whole has been arranged in such a manner that when carrying out the rotary movement around the central shaft 1, at a given moment when the bird has been clamped in, the guideway pushes the guide cam 25 upwards so that the rod 23 shifts from the position indicated by the discontinuous line. At the extremity of the rod 23 there is pivotally connected with the pivot 24 the knife holder 25a with the guide bushings 26, 27, wherein there is disposed rotatably about the axis 28 the cylindrical knife-holding arm 29 whose hook-shaped end 30 holds at the front edge the cutting knife 31. The lower end of the hook-shaped end 30 is, as indicated by the reference numeral 32, rounded and so cannot cause damage to the entrails when moving back. In its movement the knife 31 has to travel along a complicated path: from the starting position as shown in FIG. 2 with the continuous line, to the final position as drawn with the discontinuous line, the point of the knife moves, as indicated by the discontinuous line 33 in FIG. 2, not only first downwards and thereupon upwards again (path sections 33a, 33b, 33c), but also, as indicated by the discontinuous line 34 in FIG. 4,—which Figure is partly a plain and partly a cross-sectional view of the upper part of the unit shown in FIG. 2—the cutting edge of the knife 31, which in the starting position as viewed from above is on the right-hand side of the line 35 whose point of intersection with the line 35a indicates the center of the vent, first has to make a movement directed toward the line 35 (line section 34a), subsequently a swift movement directed away from the line 35 (line section 34b), then a somewhat diverging movement (line section 34c), thereupon again a swift movement directed toward the line 35 (line section 34d) followed by a movement running practically parallel to the line 35 (line section 34e). Finally, in the position as drawn by the dotted line 31a, the knife comes to a momentary rest; when the movements proceed again, the path described above is traveled in the reverse direction.

The advantage of this special path of the knife, which is essential to the device of this invention, is the fact that, when making the cut departing from the circular vent cut and directed toward the breast point, the cutting edge of the knife moves around the area containing the entrails (line sections 34b, 34c, 34d), thus preventing any possibility of damaging the entrails and subsequent disadvantages (contamination of the bird's meat and subsequent rejection thereof).

Bringing about this particular path pattern is, of course, possible in various ways, but the invention proposes a very effective and technically simple solution, having the advantage that it is possible to obtain any desired path pattern by simply exchanging two parts. These parts are formed by the end plates 36, 37 secured with screws 38 to the sides of a substantially U-shaped frame 39, whose downwardly extending supporting part 40 is attached to the frame 11, jointly with the frame part 21, by means of the screws 41, 41a. On one side the space within the U-shaped frame 39 is closed off by the end plate 36 and on the other side by the end plate 37. As shown in FIGS. 5a and 5b, each of the plates 36 and 37 is provided with a guide slot 42 and 43 respectively, which have different patterns with respect to each other; this slot is adapted to receive the guide pin 44 located at the end of the cylindrical knife-holding arm 29. When the connecting rod 23 moves from the position indicated by the continuous line to the position indicated by the discontinuous line, said two slots in combination determine the pivoting of the knife holder 25a about the pivot 24, and thus the downwardly directed movement of the point of the knife 31 (as indicated by the line 33 in FIG. 2) as well as the rotation of the cylindrical knife-holding rod 29 about the axis 28 and thus the path of travel of the cutting knife 31 in the horizontal plane, as indicated by the line 34 in FIG. 4. In order to obtain the desired path-complicated-the slot 42 has a rising portion 42a, a relatively long, initially somewhat descending and then rising portion 42b followed by a steeply rising portion 42c, with which a portion 42d is vertically associated at an angle of about 45°. The slot 43 comprises a rising portion 43a, a curved portion 43b with a relatively large radius of curvature and a relatively steeply descending portion 43c.

The advantage of the driving means of the knife described above is that, since the guide plates determine both the vertical and the horizontal movements of the knife by exchanging said plates for plates having slots with different patterns, the device can be quickly adapted in a simple manner to the birds to be treated, since the depth of the cut as well as the path of the knife in a horizontal direction, can be chosen as desired. The guide plates may consist of a wear-resistant synthetic material requiring little maintenance, while in addition they provide some protection against humidity to the knife-holder mechanism so enclosed.

Several elements not essential to the present invention have not been discussed in the above description; when being introduced into a treatment unit, the hook 5 will, naturally have to be guided, for which purpose it is possible to employ guideways such as the guideway 21 and the guideway 45, and the hook puller 46. The knife may be a cutting knife known per se, for instance a "Stanley" product, that, in an easily exchangeable manner, may be fitted into the hook-shaped portion 30 of the knife-holding arm.

What is claimed is:

1. Apparatus for making a cut in a slaughtered bird to open the skin of the bird forward of the vent toward the breast point of the bird and in which the bird is being conveyed on conveyor means along a path relative to a generally fixed support, the support and apparatus having cooperating drive structure including driving and driven means for operating said apparatus along a particular cutting locus of said support as the bird passes said locus, there being means for positioning the bird with its vent-to-neck axis generally vertical at least while at said cutting locus and said apparatus comprising:
   A. a rotary knife, means carrying said rotary knife and moving in synchronism with said conveyor means, said rotary knife being rotatable about a substantially vertical axis, said rotary knife adapted to be reciprocated on said axis while rotating to cut a circular opening at said vent and thereafter retract as said rotary knife carrying means and bird pass through said cutting locus;
   B. a generally straight edge second knife, mounting means for said second knife and a swinging arm having said mounting means coupled thereto, a framework moving in synchronism with said conveyor means and rotary knife carrying means, said framework having said arm pivotally connected thereto;
   C. the driving and driven means being effective while said bird, rotary knife carrying means and framework pass said cutting locus to swing said arm in a plane which is generally parallel with if not defined by said axis while transporting the second knife into the circular opening after the rotary knife has retracted away from said opening, along a tortuous path in the bird's skin a distance toward the breast point spaced from said vent and then in a reverse direction substantially along the same path;
   D. said mounting means for said second knife and framework having means cooperating to define said path.

2. The apparatus as claimed in claim 1 in which said means cooperating to define said path comprises cam means on said mounting means and follower means confining the movement of said cam means.

3. The apparatus as claimed in claim 2 in which said cam means comprise at least one pin carried by said mounting means and said follower means comprise at least one guide plate carrying an elongate slot and arranged on the frame to receive said pin in said slot.

4. The apparatus as claimed in claim 1 in which said cooperating means comprise cam means on the mounting means and follower means confining the movement of said cam means, said cam means comprising oppositely extending pins secured to said mounting means at an end thereof spaced from said second knife and said follower means comprise guide plates each having an elongate slot formed therein, said guide plates being disposed on opposite sides of the mounting means to receive said pins therein for movement along said slots.

5. The apparatus as claimed in claim 3 in which the said pivotal connection is located between the second knife and the pin.

6. The apparatus as claimed in claim 4 in which the said pivotal connection is located between the second knife and the pins.

7. The apparatus as claimed in claim 4 in which at least one slot has a non-rectilinear configuration.

8. The apparatus as claimed in claim 7 in which the slots are of different configuration.

9. The apparatus as claimed in claim 1 in which the cooperating means are arranged to direct the second knife to make a cut beginning at the vent, moving toward the breast along said tortuous path generally indirectly to avoid cutting the intestines of the bird.

10. The apparatus as claimed in claim 1 in which the knife carrying means include a knife holder having means at one end for securing said second knife thereto, and an opposite end,
    means for supporting said opposite end for axial rotation relative thereto,
    said support means being coupled to said arm, said cooperating means comprising cam means carried by said support means and guide plate means arranged adjacent said framework, said guide plate means carrying slot means for receiving said cam means for movement therein and defining said path.

11. The apparatus as claimed in claim 1 in which the path of said second knife includes a first portion from the vent indirectly to the breast, the knife returning to the vent in a reverse direction, substantially along said path as the bird and said apparatus pass said locus.

12. In an apparatus which conveys a slaughtered bird past an elongate cutting station at which a circular opening is cut at the vent of the bird, the bird being conveyed in vertical disposition through said station along with a knife support, means for automatically making a cut in the bird's skin extending from the circular opening toward the breast point, said means comprising:
    A. a connecting rod mounted on said knife support for swinging in a vertical plane as the bird and support move through the station;
    B. a knife holder at an end of the connecting rod, the swinging movement being arranged and effective to move the holder toward the circular opening and away from said opening;
    C. a knife arm journalled in said holder for rotation on an axis lying substantially in said plane and capable of rotating on said axis simultaneously while being translated with said holder as the rod swings;
    D. a knife blade on the end of said arm adapted to make said cut during said swinging movement, and
    E. the knife support and arm having cooperating structure for rotating said arm in a predetermined program of directions and degrees of rotation while said holder is moving to define a predetermined cutting movement of said blade other than rectilinear.

13. The cut making means as claimed in claim 12 in which the knife blade is at an angle to said axis whereby rotation of the knife arm during swinging movement will cause a tortuous cut to be made.

14. The cut making means as claimed in claim 12 in which the holder is pivotally mounted to the rod end whereby to enable rocking movement therefor during swinging of said rod.

15. The cut making means as claimed in claim 12 in which the cooperating structure comprises cam and follower means.

16. The cut making means as claimed in claim 12 in which the cooperating structure is arranged to cause the cut to start at the vent, move toward the breast point in a generally indirect path to avoid cutting intestines and then return along said path.

17. The cut making means as claimed in claim 14 in which the cooperating structure comprises cam means on the holder and follower means confining the cam movement carried by said knife support.

18. The cut making means as claimed in claim 17 in which the cam means comprise oppositely extending pins on said holder and the follower means comprise two passageways in said knife support engaged respectively by said pins.

19. The cut making means as claimed in claim 18 in which said passageways have different patterns.

20. The cut making means as claimed in claim 12 in which said knife holder includes an oblong knife holding hook-shaped arm having means for receiving said cutting knife secured thereto and an extension thereof including an end secured to said knife holder.

21. The cut making means as claimed in claim 12 in which said cooperating structure comprises a guide cam carried by said extension and said arm pivotally coupled to said holder at a location between said cutting knife and said guide cam.

22. The cut making means as claimed in claim 20 in which said extension is cylindrical and is received within said knife holder, and bearing means within said knife holder for supporting said extension therein for rotation therein.

23. The cut making means as claimed in claim 12 in which said cooperating means comprise cam means on said knife holder and plate means on said framework, said plate means arranged perpendicular to the pivotal axes of said connecting rod and parallel to the path of said knife holder.

24. The cut making means as claimed in claim 12 in which said cooperating structure includes a pair of aligned cams carried by said knife holder and protruding on opposite sides thereof and a pair of parallel guide plates, each having a guideway, said guide plates arranged disposed to accommodate said cams respectively therein, each cam cooperating with a corresponding guideway formed in each of said guide plates.

25. The cut making means as claimed in claim 12 in which said apparatus includes a frame, a central shaft means mounted on the frame for holding the bird hanging by the legs thereof and said bird holding means arranged rotatable about said central shaft with said cut making apparatus, said frame being disposable along a conveyor for said birds, and said bird holding means capable of being driven in synchronism with the conveyor.

26. The cutting making means as claimed in claim 24 in which the guideway on one guide plate is of different configuration than the guideway on the other guide plate whereby one cam follows one path and the other cam follows a different path thereby translating and pivoting said knife blade along a tortuous path from the vent to the breast in other than a straight line and returning to the vent, all without cutting the intestines of the bird.

* * * * *